United States Patent [19]

Robinson et al.

[11] 4,145,495

[45] Mar. 20, 1979

[54] AQUEOUS FREE-RADICAL POLYMERIZATION USING REDOX SYSTEM INITIATOR THAT AVOIDS ADVERSE EFFECTS OF POLYMERIZATION INHIBITING CATIONS

[75] Inventors: Peter M. Robinson, Thorton; Michael W. C. Coville, Oakwood Park; Robin W. Dexter, Ilkley, all of England

[73] Assignee: American Cyanamid Company, Stamford, Conn.

[21] Appl. No.: 909,320

[22] Filed: May 24, 1978

Related U.S. Application Data

[63] Continuation-in-part of Ser. No. 877,146, Feb. 13, 1978, abandoned.

[51] Int. Cl.² ................... C08F 2/16; C08F 4/40; C08F 220/22

[52] U.S. Cl. .................... 526/93; 526/292; 526/923

[58] Field of Search ........................ 526/93

[56] References Cited

U.S. PATENT DOCUMENTS

| 3,573,263 | 3/1971 | Gill | 526/93 |
|---|---|---|---|
| 3,635,927 | 1/1972 | Johnston et al. | 526/93 |
| 3,985,718 | 10/1976 | Chabert et al. | 526/93 |

*Primary Examiner*—Herbert J. Lilling
*Attorney, Agent, or Firm*—William J. van Loo

[57] ABSTRACT

Addition of a chelating agent and an chelatable inert cation species overcomes the inhibiting effects of impurity chelatable cation species present in an aqueous polymerization medium containing a redox system comprising an oxidizing agent and a chelatable metal reducing agent.

5 Claims, No Drawings

AQUEOUS FREE-RADICAL POLYMERIZATION USING REDOX SYSTEM INITIATOR THAT AVOIDS ADVERSE EFFECTS OF POLYMERIZATION INHIBITING CATIONS

CROSS-REFERENCE TO RELATED APPLICATIONS

This application is a continuation-in-part of application Ser. No. 877,146 filed Feb. 13, 1978, and now abandoned.

This invention relates to an improved process for preparing a water-soluble polymer in aqueous medium. More particularly, this invention relates to such a process wherein adverse effects caused by the presence of chelatable metal cations as impurities in the reaction medium are minimized.

A common procedure for preparing water-soluble polymers such as poly(acrylic acid), polyacrylamide, and copolymers thereof is to carry out the polymerization in aqueous medium using a free-radical polymerization initiator. When preparing very high molecular weight polymers, such as 1,000,000 to 100,000,000 molecular weight, which are water-soluble, it is desired that the polymer should not comprise a cross-linked network, the percentage of water in the polymerization medium should be as low as possible, and the unreacted monomer content of the final product should be as low as possible.

In one method of manufacturing these very high molecular weight polymers, the polymer solution produced takes the form of a gel which has too high a viscosity to be stirred and which therefore results in a substantial temperature rise during the polymerization, i.e., in the order of 70° C. or more. In order to provide a free-radical polymerization initiator which can be used over such a wide range of temperatures, there have been used redox systems. However, in processes using this type of initiator, the desired results enumerated above are difficult to achieve simultaneously since in order to produce a very high molecular weight material, a low initiator concentration is required which tends to increase the free monomer content of the product due to incomplete polymerization and, in addition, the higher the solids content of the polymerization medium, the higher is the final temperature and the components of many redox systems, for example a persulfate/sulfite system, react with the polymer at high temperatures to produce cross-linking thereof.

In U.S. Pat. No. 3,573,263 issued Mar. 30, 1971 to Gill, there is disclosed an improved process for carrying out such polymerization wherein the initiator employed comprises a redox system and an azo-compound free-radical source, the redox system being present in a quantity which is insufficient to complete the polymerization of the ethylenically-unsaturated monomer content present in the aqueous medium and the azo-compound free-radical source is present in sufficient quantity to complete the polymerization. A preferred redox system in the reference is a system comprising ammonium, potassium, or sodium persulfate and $NaH[Fe^{+2}(EDTA)]$ or hydrogen peroxide and $NaH[Fe^{+2}(EDTA)]$. Typically, the azo-compound free-radical source can be, for example, azobisisobutyronitrile. EDTA represents ethylenediamine tetraacetic acid and is a chelating agent for certain metal cations.

In carrying out a process of polymerization of an ethylenically-unsaturated monomer in aqueous medium using a persulfate or peroxide in conjunction with $NaH[Fe^{+2}(EDTA)]$, several problems arise which make it difficult to obtain reproducibility with respect to polymerization time and molecular weight of the polymer. In the redox system, the oxidizing agent causes ferrous ($Fe^{+2}$) ion to become ferric ($Fe^{+3}$) ion. Ferrous ion promotes polymerization while ferric ion inhibits polymerization by terminating the polymer molecules. Although ferric ion is more rapidly complexed by the chelating agent, ethylenediamine tetraacetic acid, ferrous ion is also complexed although less rapidly than is the ferric ion. If an excess of chelating agent is present, the reaction time for polymerization is unduly extended due to inhibiting effects of uncomplexed ferric ions and the molecular weight of the polymer is reduced. These conclusions are based on results in which the effects of impurity cations are ignored.

An even greater problem arises when polymerizations are conducted on an industrial scale using the redox system described immediately above. This is because the industrial grade monomers contain small but varying amounts of impurities and the water used to provide the aqueous polymerization medium is also impure and variable as to impurity content. A particular problem-causing impurity is ferric ($Fe^{+3}$) ion which, as indicated, inhibits the polymerization reaction. As a result of this impurity, the content of which can vary widely from run to run, it is essentially impossible to obtain reproducibility with respect to reaction time and molecular weight of the polymer using the type of redox system described.

There exists, therefore, the need for an improved process for controlling both the molecular weight of the polymer and the reaction time for essentially complete polymerization in the polymerization of an ethylenically-unsaturated monomer in aqueous medium using a redox system. Such a provision would fulfill a long-felt need and constitute a significant advance in the art.

In accordance with the present invention, there are provided improvements in a process for preparing a water-soluble polymer from an ethylenically-unsaturated monomer by free-radical polymerization in an aqueous polymerization medium in the presence of a redox system comprising an oxidizing agent and a chelatable metal reducing agent having a reduced and oxidized form and also in the presence of an impurity chelatable cation species inhibiting said polymerization. The improvements comprise (1) adding to said polymerization medium a chelating agent which complexes said impurity chelatable cation species at a rate faster than the reduced form of said chelatable metal reducing agent, the amount of said chelating agent added being effective in overcoming inhibiting effects of said impurity chelatable cation species, and (2) also adding to said polymerization medium a chelatable cation species inert to said polymerization, said inert chelatable cation species being complexed at a rate slower than said impurity chelatable cation species but at a rate equal to or faster than said reduced form of said chelatable metal reducing agent, the amount of said inert chelatable cation species added being in excess of the total complexing capacity of said chelating agent.

The improvements in processing provided by the present invention enable reproducibility in reaction time and molecular weight of the polymer to be achieved while maintaining low unreacted monomer content. It is unexpected that a chelatable cation species inert with respect to polymerization could be used to control the reproducibility of the polymerization reaction.

In carrying out the improved process of the present invention, the ethylenically-unsaturated monomers which can be homopolymerized or copolymerized are those which are water-soluble to a greater or lesser extent and include (a) acrylic monomers, for example, acrylic acid, methacrylic acid, acrylamide, and esters and salts of acrylic and methacrylic acids, (b) vinyl alkyl ethers, and (c) vinyl sulfonic acid salts; examples of monomers falling with these three groups include, for example, acrylic acid, methacrylic acid, acrylamide, the alkyl and aminoalkyl esters of acrylic acid and methacrylic acid, e.g. methyl acrylate, ethyl acrylate, methyl methacrylate, ethyl methacrylate and diethylaminoethyl acrylate, mono esters of acrylic acid or methacrylic acid and a glycol, e.g., hydroxyethyl methacrylate, alkali metal and ammonium salts of acrylic acid and methacrylic acid, quaternary ammonium derivatives of aminoalkyl esters of acrylic acid and methacrylic acid, e.g., methyldiethylaminoethyl methacrylate methosulfate, vinyl methyl ether, vinyl ethyl ether, and alkali metal and ammonium salts of vinyl sulfonic acid.

The redox system useful in the improved process of the present invention is one based on an oxidizing agent and a chelatable metal reducing agent. As the oxidizing agent, it is preferred, but not required, to use a persulfate such as ammonium, sodium, or potassium persulfate or hydrogen peroxide. As the chelatable metal reducing agent, there is used one which has a reduced and an oxidized form. A preferred chelatable reducing agent is a salt such as ferrous sulfate or a double salt such as ferrous ammonium sulfate. The principles of the present invention apply to other oxidizing components as well as other chelatable metal reducing agents of the type described.

The present invention does not require that an azo-compound free-radical source be employed in conjunction with the redox system, although it is possible to do so, if desired. A suitable azo-compound free-radical source is, for example, azobis(isobutyronitrile). Other well-known azo-compounds are also useful.

The present invention also requires a chelating agent that complexes the impurity chelatable cation species at a faster rate than it complexes the reduced form of the chelatable metal reducing agent. Numerous chelating agents are available that can be used to satisfy these requirements. A preferred chelating agent is ethylenediamine tetra-acetic acid. The amount of chelating agent to be added to the polymerization medium at the onset of polymerization is an amount which is effective in reducing the inhibiting effect of the impurity chelatable cation species. The amount of impurity chelatable cation species can readily be determined and an amount of chelating agent which will complex at least about half of this amount can be used. In preferred embodiments, the amount of chelating agent used will be at least equal to that necessary to complex all of the impurity chelatable cation species or more. Since an excess over the complexing capacity of chelating agent of an inert chelatable cation species is also added, excesses of chelating agent so used will not have an adverse effect on polymerization.

The present invention also requires the use of a chelatable cation species inert with respect to polymerization in the polymerization medium in conjunction with the chelating agent. This cation species should be complexed at a rate slower than the impurity chelatable cation species but at a rate equal to or faster than the reduced form of the chelatable metal reducing agent. Any chelatable metal cation species that neither promotes nor inhibits the polymerization reaction can be employed. A preferred species is zinc cation ($Zn^{+2}$). The amount of the inert cation species to be employed will be that amount which is at least equal to the total complexing capacity of the chelating agent and preferably an excess is employed. Excesses of at least twice the complexing capacity of the chelating agent or more have proven desirable. Other ions such as lead and those having stability constants at pH 3-6 of less than $Fe^{+3}$/EDTA may be employed.

Impurity chelatable cation species inhibiting polymerization are principally ferric ($Fe^{+3}$) and cupric ($Cu^{+2}$), although other cation species may also be adverse. The quantity of impurity cation species may vary widely, usually from about 0.1 to about 1.5 parts per million parts of polymerization medium. The present invention provides a process which is effective whether or not an impurity cation species is present. However, since it is virtually impossible to prevent impurity cations from arising on an industrial scale of operation, the process will generally be operated in the presence of such impurity. The impurities may arise in the monomer content employed, the water used to provide the polymerization medium or both. Although the content of impurities can be determined by analysis, it is desirable to be able to operate without awaiting results of such analysis. The present invention provides a wide latitude of impurity content while still providing an improved process.

As indicated above, the aqueous polymerization medium may contain a single monomer, e.g., acrylamide, or a mixture of copolymerizable monomers, e.g., dimethylaminoethyl methacrylate and acrylamide.

The polymerization of the monomer content present in the aqueous medium can be effected under conditions used in the art; thus, for example, in one procedure the aqueous medium containing the monomer and the apparatus employed is purged with $N_2$ or $CO_2$ or other inert gas before the addition of the polymerization initiator.

The invention is further illustrated by the examples which follow wherein all parts and percentages are by weight unless otherwise specified.

COMPARATIVE EXAMPLE A

The procedure of Example 3 of U.S. Pat. No. 3,573,263 was followed using as the polymerization initiator that described below.

A 32.5% aqueous solution of 15 mol percent dimethylaminoethyl methacrylate quaternary with methyl chloride and the balance acrylamide was prepared at pH 3.0. A 200 gram quantity of the solution contained in a vacuum flask was purged for 10 minutes with nitrogen and the following initiator was added:

21 ppm $FeSO_4.(NH_4)_2SO_4.6H_2O$
12 ppm ammonium persulfate
200 ppm azobisisobutyronitrile.

The polymerization reaction system contained 0.3 ppm $Fe^{+3}$ as an impurity.

The polymerization required 300 minutes and an exotherm of 64° C. resulted. The resulting polymer exhibited a standard viscosity of 3.55 centipoises, measured as a 0.1% aqueous polymer solution in 1M NaCl at 25° C. using a Brookfield viscometer. This product is designated standard.

COMPARATIVE EXAMPLES B, C, and D

The procedure of Comparative Example A was followed in three additional runs except that in separate runs increasing amounts of $Fe^{+3}$ cation were added with the polymerization initiator. Details and results are given in Table I.

TABLE I

| Comparative Example | $Fe^{+3}$ (ppm)[1] | Standard Viscosity (cps) | Polymerization Time (min) | Exotherm (°C.) |
|---|---|---|---|---|
| A (Standard) | 0.3 | 3.55 | 300 | 64 |
| B | 0.8 | 3.40 | 330 | 61 |
| C | 1.3 | 3.36 | 360 | 57 |
| D | 2.3 | very low | 390 | 33 |

Note:
[1]This amount includes an original impurity content of 0.3 ppm and, where appropriate, added impurity as $Fe^{+3}$. The amount is exclusive of any $Fe^{+3}$ arising from the initiator system.

The results show that small quantities of $Fe^{+3}$ reduce the standard viscosity of the polymer (indicative of molecular weight, increase the time necessary to complete the polymerization reaction, and reduce the temperature of the exotherm.

COMPARATIVE EXAMPLES E–J

The procedure of Comparative Example A was again followed in eight additional runs in which in separate runs at fixed levels of added $Fe^{+3}$ ion, various levels of $Zn^{+2}$/EDTA complex were added. Details and results are given in Table II.

TABLE II
EFFECT OF ADDED $Zn^{+2}$/EDTA COMPLEX ON POLYMERIZATION CONTAINING ADDED $Fe^{+3}$ ION

| Comparative Example | $Fe^{+3}$ (ppm)[1] | $Zn^{+2}$/EDTA Equivalents | Standard Viscosity (cps) | Polymerization Time (min) | Exotherm (°C.) |
|---|---|---|---|---|---|
| E | 0.8 | 0 | 3.44 | 330 | 57.5 |
| F | 0.8 | 0.5 | 3.65 | 330 | 56.5 |
| G | 0.8 | 1.0 | 4.05 | 390 | 61 |
| H | 1.3 | 0.5 | 3.58 | 360 | 55 |
| I | 1.3 | 1.0 | 3.70 | 360 | 57 |
| J | 1.3 | 1.5 | 4.21 | 390 | 57 |

Note:
[1]Includes 0.3 ppm of impurity, balance added

These results show that the use of $Zn^{+2}$/EDTA complex increases reaction time and viscosity.

EXAMPLES 1 and 2

The procedure of Comparative Example A was again followed in three additional runs, one repeating the standard preparation, a second using no added $Fe^{+3}$ ion but using $Zn^{+2}$/EDTA and an excess of $Zn^{+2}$ ions, and a third using added $Fe^{+3}$ ions, $Zn^{+2}$/EDTA and an excess of $Zn^{+2}$ ions. Details and results are given in Table III.

TABLE III
EFFECT OF $Zn^{+2}$/EDTA AND EXCESS $Zn^{+2}$

| Example | $Fe^{+3}$ (ppm)[1] | $Zn^{+2}$/EDTA (equivalents) | $Zn^{+2}$ (equivalents)[2] | Standard Viscosity (cps) | Polymerization Time (min) | Exotherm (°C.) |
|---|---|---|---|---|---|---|
| Comp. A | 0.3 | 0 | 0 | 3.4 | 260 | 79 |
| 1 | 0.3 | 1.5 | 4 | 3.8 | 180 | 79 |
| 2 | 1.8 | 1.5 | 4 | 3.8 | 170 | 79 |

Notes:
[1]0.3 ppm impurity, balance added.
[2]Excess of EDTA capacity.

These results show that the use of the full $Zn^{+2}$/EDTA complex with an excess of $Zn^{+2}$ provides reproducible high viscosity with shorter reaction times.

EXAMPLES 3–10

The procedure of Examples 1 and 2 was again followed except that the monomer content was 25 mol percent of dimethylaminoethyl methacrylate quaternary with methyl chloride and 75 mol percent of acrylamide, the monomer solution containing 40% monomer content. Details and results are given in Table IV.

TABLE IV

| Example | $Fe^{+3}$ (ppm)[1] | $Zn^{+2}$/EDTA (equivalents) | $Zn^{+2}$ (equivalents)[2] | Exotherm (°C.) | Polymerization Time (min) | Standard Viscosity (cps) |
|---|---|---|---|---|---|---|
| 3 | 0.3 | 0 | 0 | 68 | 390 | 2.86 |
| 4 | 0.3 | 2.5 | 15 | 73 | 150 | 3.40 |
| 5 | 2.8 | 0 | 0 | 37.5 | 300 | * |
| 6 | 2.8 | 1.0 | 6 | 67.5 | 390 | 2.86 |
| 7 | 2.8 | 1.5 | 9 | 68 | 270 | 2.91 |
| 8 | 2.8 | 2.0 | 12 | 72.5 | 180 | 3.10 |
| 9 | 2.8 | 2.5 | 15 | 73 | 150 | 3.20 |
| 10 | 2.8 | 3.0 | 18 | 73.5 | 135 | 3.35 |

Notes:
[1]0.3 ppm impurity, balance added.
[2]Excess over EDTA requirements
*Too low to measure.

These results show that in the presence of impurity $Fe^{+3}$ ion, the combination of $Zn^{+2}$/EDTA and excess $Zn^{+2}$ provides increased viscosity in reduced polymerization time.

EXAMPLES 11–18

The procedure of Examples 1 and 2 was again followed using 15 mole percent of dimethylaminoethyl methacrylate quaternary with methyl chloride and 85 mole percent of acrylamide. The initiator system was 3ppm $Fe^{+2}$, 12 ppm ammonium persulfate, and 200 ppm azobisisobutyronitrile. A series of six runs were made in which the amount of added (impurity) $Fe^{+3}$ ion was varied using a fixed content of $Zn^{+2}$/EDTA and excess $Zn^{+2}$ ions. Two control runs were also made. Results and details are given in Table V.

TABLE V

| Example | $Fe^{+3}$ (ppm)[1] | EDTA (equivalents) | $Zn^{+2}$ (equivalents) | Standard Viscosity (cps) | Polymerization Time (min) | Temp. Rise (°C.) |
|---|---|---|---|---|---|---|
| 11 | 0.3 | 0 | 0 | 3.39 | 335 | 70.0 |
| 12 | 0.3 | 5 | 20 | 4.01 | 170 | 72.0 |
| 13 | 1.3 | 5 | 20 | 4.00 | 155 | 70.5 |
| 14 | 2.3 | 5 | 20 | 4.20 | 140 | 70.5 |
| 15 | 3.3 | 5 | 20 | 4.06 | 140 | 70.0 |
| 16 | 4.3 | 5 | 20 | 4.00 | 145 | 69.5 |
| 17 | 5.3 | 5 | 20 | 3.73 | 175 | 69.6 |
| 18 | 5.3 | 0 | 0 | 3.00 | 225 | 42.5 |

Note:
[1]0.3 ppm impurity, balance added.

These results show the higher viscosities and shorter reaction times achieved following the improved process of the invention.

EXAMPLES 19–24

The procedure of Examples 1 and 2 was again followed using 10 mole percent of the quaternary monomer used therein and the balance acrylamide. The reaction mixture contained 40 weight percent of monomers. The initiator system employed was 3 ppm $Fe^{+3}$, 12 ppm ammonium persulfate, and 400 ppm of azobisisobutyronitrile. Initial pH was 3.0 and initial temperature was 5° C. Details and results are given in Table IV.

TABLE VI

| Example | Fe$^{+3}$ (ppm)[1] | Zn$^{+2}$ (equiv) | EDTA (equiv) | Polymerization Time (min) | Exotherm (° C.) | Standard Viscosity (cps) |
| --- | --- | --- | --- | --- | --- | --- |
| 19 | 1.8 | 12.0 | 0.5 | 120 | 68 | 3.39 |
| 20 | 1.8 | 12.0 | 1.0 | 105 | — | 3.55 |
| 21 | 1.8 | 12.0 | 1.5 | 100 | 69 | 3.86 |
| 22 | 1.8 | 12.0 | 2.0 | 110 | 71 | 3.80 |
| 23 | 1.8 | 12.0 | 2.5 | 100 | 69 | 3.94 |
| 24 | 1.8 | 12.0 | 3.0 | 95 | 69 | 3.96 |

Note:
[1] 0.3 ppm impurity, balance added.

The results show that increased amounts of chelating agent with excess zinc cations increases standard viscosity and reduces reaction time.

EXAMPLES 25–32

Again following the procedure of Examples 1 and 2, a series of runs were made using 25 mole percent of dimethylaminoethyl methacrylate quaternarized with methyl chloride and the balance acrylamide, using a reaction medium containing 40 weight percent monomers. Initial pH was 3.0 and initial temperature was 0° C. Details and results are given in Table VII.

TABLE VII

| Example | Fe$^{+3}$ (ppm)[2] | EDTA (equiv) | Zn$^{+2}$ (equiv) | Polymerization Time (min) | Exotherm (° C.) | Standard Viscosity (cps) |
| --- | --- | --- | --- | --- | --- | --- |
| 25 | 0.3 | 0 | 0 | 390 | 68 | 2.86 |
| 26 | 0.3 | 2.5 | 15 | 150 | 73 | 3.40 |
| 27 | 2.8 | 0 | 0 | 300 | 37.5 | incomplete reaction |
| 28 | 2.8 | 1.0 | 6 | 390 | 67.5 | 2.86 |
| 29 | 2.8 | 1.5 | 9 | 270 | 68.0 | 2.91 |
| 30 | 2.8 | 2.0 | 12 | 180 | 72.5 | 3.10 |
| 31 | 2.8 | 2.5 | 15 | 150 | 73.0 | 3.20 |
| 32 | 2.8 | 3.0 | 18 | 135 | 73.5 | 3.35 |

Note:
[1] 0.3 ppm impurity, balance added.

These results again show the increased standard viscosity and reduced reaction time provided by the present invention.

We claim:

1. In a process for preparing a water-soluble polymer from an ethylenically unsaturated monomer by free-radical polymerization in an aqueous polymerization medium in the presence of a redox system comprising an oxidizing agent and a chelatable metal reducing agent having a reduced and oxidized form and also in the presence of an impurity chelatable cation species inhibiting said polymerization, the improvements which comprise (1) adding to said polymerization medium a chelating agent which complexes said impurity chelatable cation species at a rate faster than the reduced form of said chelatable reducing agent, the amount of said chelating agent added being effective in overcoming inhibiting effects of said impurity chelatable cation species, and (2) also adding to said polymerization medium a chelatable cation species inert to said polymerization, said inert chelatable cation species being complexed at a rate slower than said impurity chelatable cation species but at a rate equal to or faster than said reduced form of said chelatable metal reducing agent, the amount of said inert chelatable cation species being in excess of the total complexing capacity of said chelating agent.

2. The process of claim 1 wherein said chelatable metal reducing agent is ferrous ammonium sulfate.

3. The process of claim 1 wherein said inert chelatable cation species is Zn$^{+2}$.

4. The process of claim 1 wherein said polymerization medium also contains an azo-compound free-radical source.

5. The process of claim 1 wherein said azo-compound free-radical source is azobisisobutyronitrile.

* * * * *